United States Patent
Weaver et al.

(10) Patent No.: US 8,413,964 B2
(45) Date of Patent: Apr. 9, 2013

(54) FIBER DROP INSTALLATION DEVICE

(75) Inventors: Patrick Allen Weaver, Baden, PA (US); Jeffrey M. Conkel, Wexford, PA (US)

(73) Assignees: Verizon Patent and Licensing Inc., Basking Ridge, NJ (US); Verizon Pennsylvania LLC, Philadelphia, PA (US)

( * ) Notice: Subject to any disclaimer, the term of this patent is extended or adjusted under 35 U.S.C. 154(b) by 1261 days.

(21) Appl. No.: 11/966,628

(22) Filed: Dec. 28, 2007

(65) Prior Publication Data
US 2009/0166597 A1 Jul. 2, 2009

(51) Int. Cl.
*B63B 35/03* (2006.01)
*B65H 59/00* (2006.01)
*E21C 29/16* (2006.01)
*H02G 1/08* (2006.01)
*B66F 3/00* (2006.01)
*G02B 6/44* (2006.01)
*G02B 6/46* (2006.01)

(52) U.S. Cl. ........ 254/134.3 R; 254/134.3 FT; 254/134; 385/100

(58) Field of Classification Search ........... 254/134.3 R, 254/134.4, 93 R, 134, 134.3 FT; 385/100, 385/147
See application file for complete search history.

(56) References Cited

U.S. PATENT DOCUMENTS

| | | | | |
|---|---|---|---|---|
| 2,930,584 | A | * | 3/1960 | Hamrick et al. ...... 254/134.3 FT |
| 4,691,896 | A | * | 9/1987 | Reeve et al. ................ 254/134.4 |
| 4,783,054 | A | * | 11/1988 | Morel et al. ................ 254/134.4 |
| 5,199,689 | A | * | 4/1993 | Proud et al. ................ 254/134.4 |
| 5,211,377 | A | * | 5/1993 | Griffioen et al. ........... 254/134.4 |
| 5,246,207 | A | * | 9/1993 | Horii et al. ................. 254/134.4 |
| 5,308,041 | A | * | 5/1994 | Griffioen et al. ........... 254/134.4 |
| 5,456,450 | A | * | 10/1995 | Reeve et al. ................ 254/134.4 |
| 5,645,267 | A |   | 7/1997 | Reeve et al. |
| 5,992,250 | A | * | 11/1999 | Kluth et al. .................. 73/866.5 |
| 6,173,107 | B1 | * | 1/2001 | Reeve et al. .................... 385/147 |
| 6,311,953 | B1 | * | 11/2001 | Lang et al. ................. 254/134.4 |
| 6,364,290 | B1 | * | 4/2002 | Barker ........................ 254/134.4 |
| 6,631,884 | B2 | * | 10/2003 | Griffioen et al. ........ 254/134.3 R |
| 6,711,328 | B2 | * | 3/2004 | Griffioen et al. .............. 385/100 |
| 6,848,541 | B2 | * | 2/2005 | Griffioen et al. ............. 184/15.2 |
| 6,879,760 | B2 | * | 4/2005 | Griffioen et al. .............. 385/100 |
| 7,021,426 | B2 | * | 4/2006 | Griffioen et al. ............. 184/15.2 |
| 2008/0011990 | A1 | * | 1/2008 | Kostet et al. ................... 254/134 |
| 2009/0065753 | A1 | * | 3/2009 | Gonen et al. ................. 254/93 R |
| 2011/0114018 | A1 | * | 5/2011 | Mather et al. .................. 118/620 |

* cited by examiner

*Primary Examiner* — Lee D Wilson
*Assistant Examiner* — Alvin Grant

(57) ABSTRACT

An optical fiber installation device may include a housing having a drop receiving channel extending therethrough. A drive wheel may be rotatably positioned in the housing and configured to rotatably engage a fiber optic drop provided in the drop receiving channel. The housing may include an air pathway for applying a first flow of pressurized air from an air source to the drive wheel. The first flow of pressurized air may cause the drive wheel to rotate and propel the fiber optic drop through the drop receiving channel.

27 Claims, 4 Drawing Sheets

FIBER DROP INSTALLATION DEVICE

BACKGROUND

In fiber optic transmission systems, signals are transmitted along lengths of optical fiber by light waves generated from a source thereof, such as a laser. Optical fiber is typically fabricated of glass materials and is very delicate or fragile. An optical fiber may be on the order of 125 microns in diameter or smaller.

In some fiber optic transmission systems, lengths of fiber optic cables or "drops" must be installed through ducts, conduits, or the like. For example, when providing service to individual units in a multi-unit dwelling (e.g., an apartment building), a fiber drop must be placed at each individual unit in a multi-unit dwelling. This is typically accomplished by placing a conduit or duct from a central service provision location to a predetermined location in each individual unit that happens to be served by that location. The duct may be placed at either the time of the initial construction or at the time that the service order is placed.

Regardless of the time at which the micro-duct is installed, prior to initiating service to a particular unit, a fiber optic drop is placed within the duct from the terminal to the particular unit. This is typically accomplished by pulling the drop through the micro-duct using a nylon string. Unfortunately, if a distance from the service provision location to the unit is significant, or if a number of bends in the duct are numerous or severely angled, then the pull string may be prone to breaking.

DETAILED DESCRIPTION OF PREFERRED EMBODIMENTS

The following detailed description of implementations consistent with the present invention refers to the accompanying drawings. The same reference numbers in different drawings may identify the same or similar elements. Also, the following detailed description does not limit the invention. Instead, the scope of the invention is defined by the appended claims and equivalents.

Devices and methods consistent with aspects described herein provide for efficient installation of lengths of optical fibers within installation conduits. More specifically, a device may be provided for actively pushing a length of optical fiber into the conduit by using one or more drive wheels, to positively engage and propel the optical fiber through the conduit, and a constant flow of pressurized air to reduce friction between the conduit and the length of optical fiber.

Figure 1:
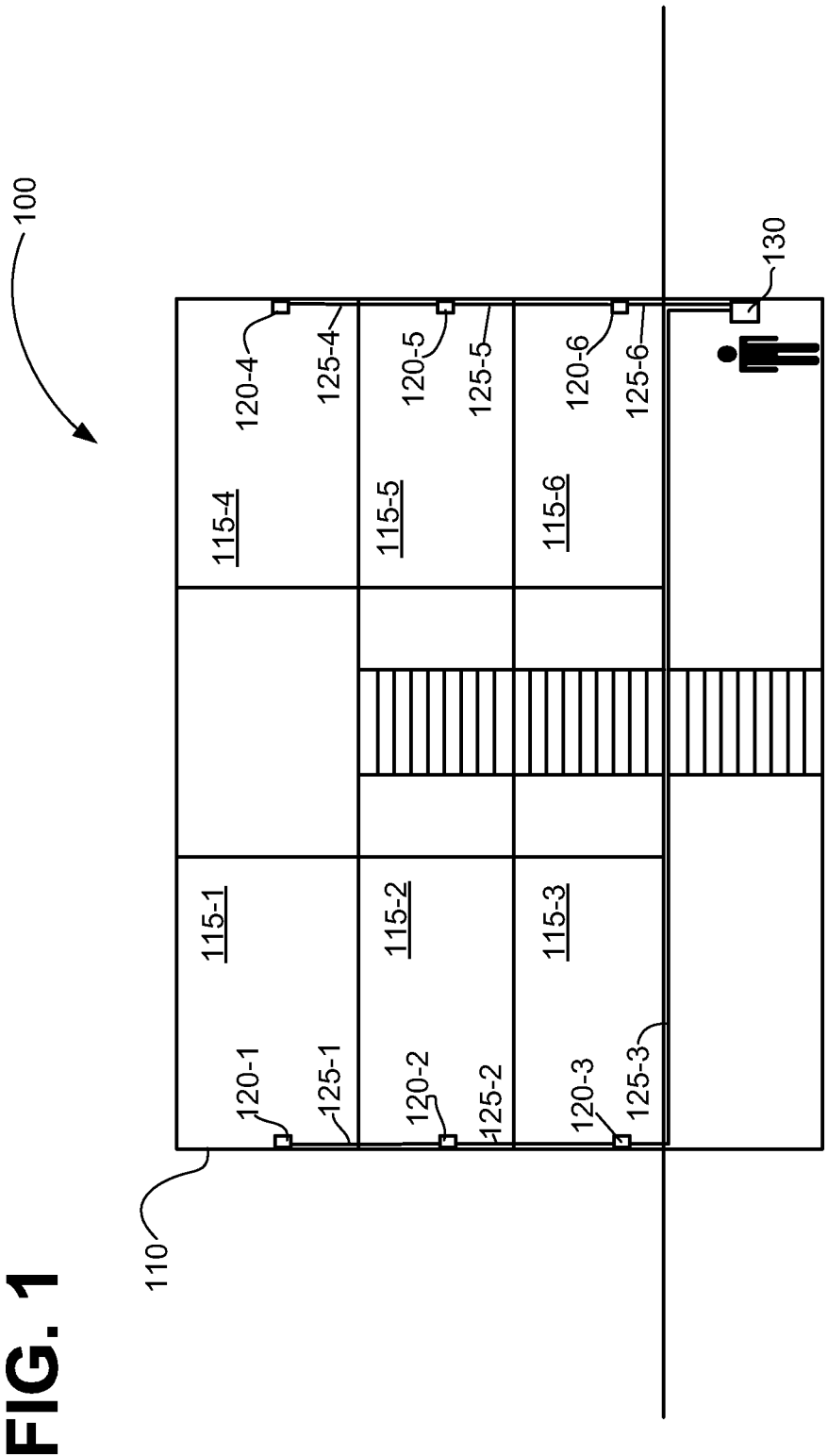
FIG. 1 is a block diagram illustrating an exemplary application environment in which the devices and methods described herein may be implemented.

FIG. 1 is a block diagram illustrating an exemplary application environment 100 in which devices and methods described herein may be implemented. As illustrated, application environment 100 may include a multi-unit building 110, units 115-1 to 115-6, drop entry points 120-1 to 120-6, conduits 125-1 to 125-6, and a service provision location 130.

Multi-unit building 110 may include a physical structure, such as an apartment building, an office building, etc., having a number of individual units 115-1 through 115-6 (collectively "units 115" or individually "unit 115") provided therein. As described above, each unit 115 may be provided with a corresponding drop entry point 120-1 to 120-6 (collectively "drop entry points 120" or individually "drop entry point 120") for receiving a fiber drop. For example, a utility room or utility closet in unit 115 may be provided with drop entry point 120.

In some embodiments, drop entry point 120 may include a device or port capable of receiving a fiber drop. Further, in some implementations, drop entry point 120 may be provided or installed during initial construction of multi-unit building 110 or may be provided during provision of fiber-based services to a particular unit 120 in multi-unit building 110.

Each drop entry point 120 may be serviced by a corresponding conduit 125-1 to 125-6 (collectively "conduits 125" or individually "conduit 125") for facilitating delivery of a fiber drop from service provision location 130 to each unit 115. As illustrated, depending on a location of unit 115 relative to service provision location 130, conduits 125 may extend hundreds of feet in length and may include multiple bends.

In some implementations, service provision location 130 may be provided in a centralized location relative to units 115. Alternatively, service provision location 130 may be provided at a common building access point for building service providers, such as a basement or utility room(s). In yet other implementations, multiple service provision locations 130 may be provided for selected ones of units 115, such as a first service provision location for a first group of units and a second service provision location for a second group of units.

A single multi-unit building 110, six units 115, six drop entry points 120, six conduits 125, and a single service provision location 130 have been illustrated in FIG. 1 for simplicity. In practice, there may be more or fewer multi-unit buildings, units, drop entry points, conduits, and service provision locations.

Figure 2:
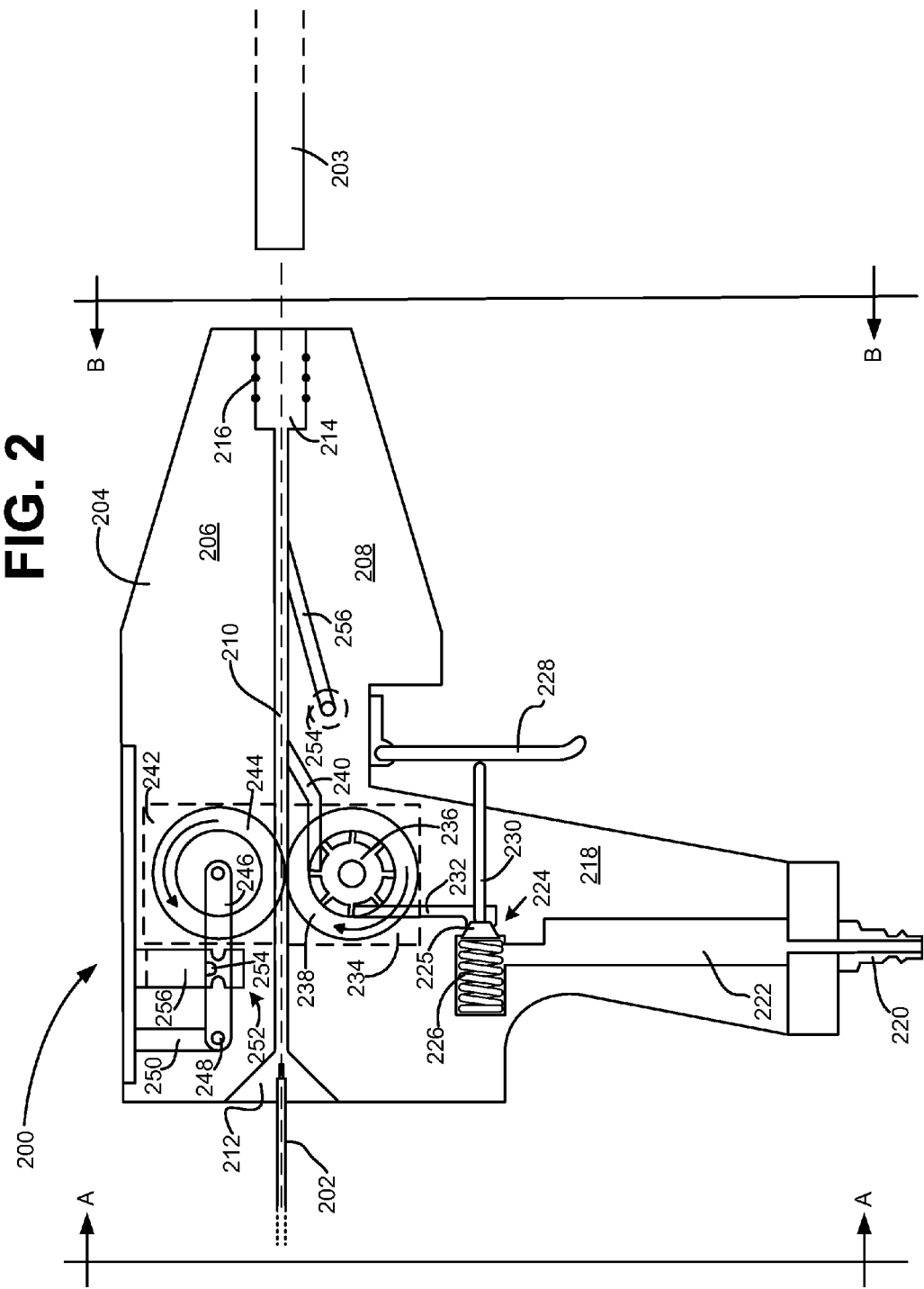
FIG. 2 is a schematic diagram illustrating an exemplary implementation of a fiber drop blowing device for use with the application environment of FIG. 1.

FIG. 2 is a schematic diagram illustrating an exemplary implementation of a fiber drop blowing device 200 for use with application environment 100 of FIG. 1. In the embodiment of FIG. 2, fiber drop blowing device 200 may facilitate efficient installation of a fiber drop 202 within conduit 125. In one exemplary implementation, conduit 125 may include a microduct 203 having an outside diameter of ranging from approximately 8.5 mm to 12.7 mm.

In one implementation consistent with embodiments described herein, fiber drop blowing device 200 may include a housing 204 that includes an upper housing 206 and a lower housing 208, a drop receiving channel 210, a drop receiving area 212, a duct receiving cavity 214, a duct receiving seal(s) 216, a handle portion 218, a first connector 220, a first air chamber 222, a valve assembly 224, a valve 225, a spring 226, an actuator 228, a valve engaging member 230, a flywheel feeding pathway 232, a flywheel chamber 234, a flywheel 236, a drive wheel 238, an escape pathway 240, a guide wheel chamber 242, a guide wheel 244, a guide wheel support 246, a hinge 248, a hinge support 250, a flexible clamping member 252, a second connector 254, and an air pathway 256.

As illustrated, housing 204 may include a two part-housing that includes upper housing 206 and lower housing 208 releasably connected by a hinge element on one side of housing 204 (shown at element 302 in FIGS. 3A and 3B) and a corresponding clamping/latching element (shown at element 304 in FIGS. 3A and 3B) on the opposite side of housing 204. Upper housing 206 and lower housing 208 may be formed of any suitable material and in any suitable manner, such as die cast aluminum or injection molded plastic. Opening of housing 204 (e.g., via hinge 304) may facilitate removal of drop 202 from drop receiving channel 210 upon insertion of a desired length of drop 202 into microduct 203.

Drop receiving channel 210 may be formed longitudinally in a central or axial portion of housing 204 at the location where upper housing 206 meets lower housing 208, such that a top half of drop receiving channel 210 may be formed in upper housing 206 and a bottom half of drop receiving channel 210 may be formed in lower housing 208. In one implementation, drop receiving channel 210 may be formed with a circular cross-section and may be sized to receive fiber drops of a variety of sizes. As illustrated, drop receiving channel 210 may extend from a proximal end of fiber drop blowing device 200 to a distal end of fiber drop blowing device 200 thereby enabling fiber drop 202, received therein, to extend entirely through fiber drop blowing device 200.

The proximal end of housing 204 (and drop receiving channel 210) may be formed as drop receiving area 212. In one implementation, drop receiving area 212 may be formed in a conical or funnel shape designed to assist entry of drop 202 into drop receiving channel 210. The shape of drop receiving area 212 may also limit possible micro bends in the length of received drop. A top half of drop receiving area 212 may be formed in upper housing 206 and a bottom half of drop receiving area 212 may be formed in lower housing 208.

Duct receiving cavity 214 may be formed at the distal end of drop receiving channel 210 in housing 204. In one implementation, duct receiving cavity 214 may have a substantially cylindrical shape and may be sized to receive an end of microduct 203. Duct receiving seal(s) 216 may be formed in duct receiving cavity 214 to engage microduct 203 and prevent or limit the flow of air around microduct 203. In an exemplary embodiment, duct receiving seal(s) 216 may include one or more plastic or rubber "O"-rings provided in corresponding grooves in duct receiving cavity 216.

Lower housing 208 of fiber drop blowing device 200 may include handle portion 218 sized to be received and held by a user's hand. First connector 220 may be adapted to receive a flow of pressurized air from an air source, such as an air compressor (not shown). In one implementation, first connector 220 may be located at a bottom of handle portion 218. First air chamber 222 may be provided in handle portion 218 and may communicate with first connector 220 to receive the flow of pressurized air from the air source.

Valve assembly 224 may be positioned to control the amount of air flow between first air chamber 222 and flywheel feeding pathway 232. Valve assembly 224 may include valve 225 moveably positioned in an opening between first air chamber 222 and flywheel feeding pathway 232. As shown, valve 225 may be seated against spring 226 and engaged by valve engaging member 230 upon user manipulation of actuator 228. In one implementation, actuator 228 may be configured as a trigger engaged by a user holding handle portion 218. In one implementation, an actuator-side surface of valve 225 may include an angled or partially conical shape (as illustrated in FIG. 2). By providing valve 225 with this shape, air pressure in air chamber 222 as well as pressure from spring 226 may keep valve closed prior to engagement by actuator 230.

An opposite end of flywheel feeding pathway 232 may provide air flow received from first air chamber 222 to flywheel 236 rotatably positioned in flywheel chamber 234. As illustrated, flywheel 236 may include a number of fins or protrusions configured to receive the flow of air from flywheel feeding pathway 232 and rotate in response thereto. Drive wheel 238 may be attached to flywheel 236, such that rotation of flywheel 236 causes corresponding rotation of drive wheel 238. Drive wheel 238 may be positioned adjacent to an interior opening in drop receiving channel 210, such that drive wheel 238 engages a surface of drop 202 extending through drop receiving channel 210. In one implementation, drive wheel 238 may be formed of rubber or plastic having a friction coefficient suitable for grippingly engaging fiber drop 202 and propelling drop 202 through drop receiving channel 210 upon rotation of drive wheel 238.

Escape pathway 240 may provide an outlet for air flow driving flywheel 236. As illustrated, escape pathway 240 may be connected to drop receiving channel 210 so that airflow driving flywheel 238 may be used to further assist in insertion of drop 202 in drop receiving channel 210 and microduct 203 by reducing friction in drop receiving channel 210 and microduct 203.

To further assist in propelling fiber drop 202 through drop receiving channel 210 and into microduct 203, guide wheel 244 may be rotatably positioned in guide wheel chamber 242 via guide wheel support 246. As illustrated, guide wheel support 246 may enable guide wheel 244 to be adjustably positioned in a vertical direction relative to drop receiving chamber 210 and drive wheel 238.

In one implementation, guide wheel 244 may be formed of rubber or plastic having a friction coefficient suitable for grippingly engaging fiber drop 202. Upon propulsion of fiber drop 202 through drop receiving channel 210 by drive wheel 238, guide wheel 244 may rotate about its axis, thereby assisting in the propelling of drop 202 through drop receiving channel 210 upon rotation of drive wheel 238.

Guide wheel support 246 may be hingedly mounted to hinge support 250 via hinge 248, such that rotation of guide wheel support 246 about the axis of hinge 248 provides for vertical movement of guide wheel 244. In this manner, fiber drop blowing device 200 may be adapted to receive and install multiple sizes of fiber drop 202. Flexible clamping member 252 may provide a resistive element to impair movement of guide wheel support 246 and, thusly, guide wheel 244.

In one implementation, flexible clamping member 252 may include a flexible band 254 mounted between two fixed flexible clamping member support elements 256. Flexible clamping member support elements 256 may be positioned on either side of guide wheel support 246 and may be configured to provide fixed support for flexible band 254. As shown, flexible band 254 may be supported by flexible clamping member support elements 256 and may be configured to exert a downward force against guide wheel support 246 to initially position guide wheel support 246 such that guide wheel 244 comes into contact with drive wheel 238. Upon insertion of fiber drop 202 into drop receiving channel 210 (e.g., via drop receiving area 212), pressure on guide wheel 244 may cause movement in guide wheel 244 and guide wheel support 246 about hinge 248. Upon this movement, flexible band 254 may be positioned to exert an opposing force to the movement of guide wheel support 246, thereby maintaining a clamping relationship between drive wheel 238, fiber drop 202, and guide wheel 244. In an alternative implementation, flexible clamping member may include a spring configured to oppose vertical movement of guide wheel support 246.

Second connector 254 may be adapted to receive a second flow of pressurized air from an air source, such as an air compressor (not shown). Air pathway 256 in housing 204 may be configured to direct a constant flow of air through second connector 254 to drop receiving channel 210. By providing second connector and 254 and air pathway 256, a constant flow of air may be provided to drop receiving channel 210 and microduct 203, regardless of the position of valve assembly 224. The presence of this additional, constant air flow prevents build-up of friction cause by engaging and disengaging valve assembly 224.

Although fiber drop blowing tool 200 has been illustrated as including a variety of components and/or structures, it should be understood that these components and structures are not limiting and that any suitable combination of components and/or structures may be used.

Figure 3:
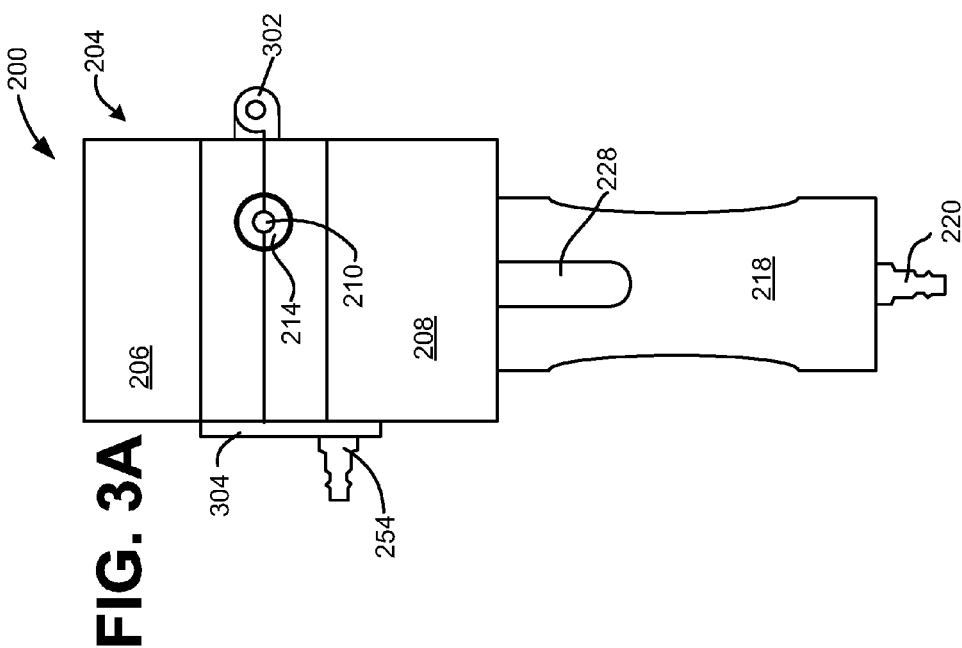
FIG. 3B is a schematic diagram of the fiber drop blowing device of FIG. 2 taken along the line "A-A"
FIG. 3A is a schematic diagram of the fiber drop blowing device of FIG. 2 taken along the line "B-B"

FIG. 3A is a schematic diagram of an external view of fiber drop blowing device 200 taken along the line "B-B" in FIG. 2. As illustrated, in one implementation, housing 204 of fiber drop blowing device 200 may have a substantially rectangular cross-section. Further, as mentioned above, upper housing 206 may be hingedly attached to lower housing 208 via hinge assembly 302. In this manner, upper housing 206 may be rotated away from lower housing 208 to facilitate insertion and removal of fiber drop 202 (not shown in FIG. 3A) in fiber receiving cavity 210. While closed (as shown in FIG. 3A), upper housing 206 may be fastened to lower housing 208 via latch assembly 304. In one implementation consistent with embodiments described herein, latch assembly 304 may exert a clamping force on upper housing 206 and lower housing 208 to reduce or eliminate leakage of air from drop receiving channel 210.

As illustrated in FIG. 3A, handle portion 218 of housing 204 may be provided with a contoured exterior or "pistol grip" to assist in gripping and/or holding of fiber drop blowing tool and in application of pressure to actuator or "trigger" 228.

Duct receiving cavity 214 may be provided co-axially with fiber drop receiving channel 210. Further, as described above, duct receiving cavity 214 may be shaped to receive a fiber drop duct or conduit (e.g., a microduct) having a substantially circular cross-section. Duct receiving seal 216 may be provided in duct receiving cavity 214 to prevent or reduce air loss around a duct or conduit (e.g., microduct 203 of FIG. 2) positioned in duct receiving cavity 214.

FIG. 3B is a schematic diagram of fiber drop blowing device 200 taken along the line "A-A" in FIG. 2. As illustrated, drop receiving area 212 may be provided substantially co-axially with drop receiving channel 210.

Figure 4:
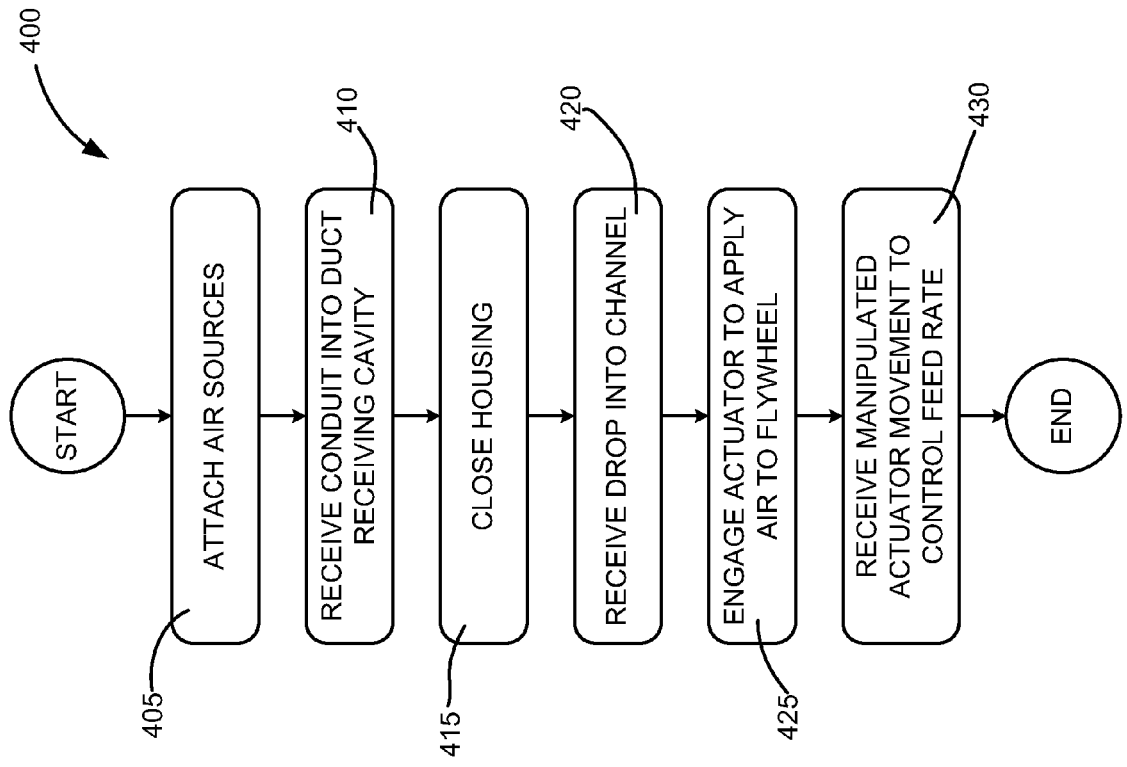
FIG. 4 is a flow diagram illustrating exemplary processing for installing a fiber drop in the application environment of FIG. 1 using the fiber drop blowing tool of FIG. 2.

FIG. 4 is a flow diagram illustrating exemplary processing for installing a fiber drop in the application environment of FIG. 1 using the fiber drop blowing tool of FIG. 2. The process may begin with air sources being coupled to first connector 220 and second connector 254 (block 405). For example, air hoses connected to one or more sources of pressurized air and having corresponding connectors may be releasably connected to first connector 220 and second connector 254.

A drop receiving duct or conduit (e.g., microduct 203) may be received into duct receiving cavity 214 (block 410). Upper housing 206 may then be closed relative to lower housing 208 (block 415). As discussed above, the duct may be sealed into duct receiving cavity 214 by duct receiving seal(s) 216 positioned in duct receiving cavity 214 and engaged with microduct 203 upon closure of housing 204.

A length of fiber drop (e.g., drop 202) may be received into drop receiving channel 210, e.g., via drop receiving area 212 (block 420). In one implementation, the drop may be fed into drop receiving channel 210 via drop receiving area 212 when upper housing 206 of fiber drop blowing device 200 is in a closed position relative to lower housing 208. In another alternative implementation, drop 202 may be laid in drop receiving channel 210 when housing 204 of fiber drop blowing device 200 is open.

Actuator 228 may be engaged, thereby opening valve assembly 224 and providing a flow of pressurized air from the first connector 220 to flywheel 236 (block 425). In one implementation, the flow of air may travel from first connector 220 to flywheel 236 via first air chamber 222, valve assembly 224, and flywheel feeding pathway 232.

Manipulated actuator movements may be received to control the feed rate of the drop within drop receiving channel 210 and within the receiving conduit (block 430). Based on the degree of movement of actuator 228 (e.g., how far the trigger is pulled), more or less air may be applied to flywheel 236. The more air applied to flywheel 236 results in a high feed rate, while less air applied to flywheel 236 results in a lower feed rate.

Implementations consistent with aspects described herein provide an air-powered tool for facilitating the rapid and effective placement of a fiber optic drop within a drop receiving duct or conduit, such as a microduct. A first air connection receives air via a valve assembly for adjustably propelling the fiber optic drop through the duct, while a second connection receives a constant flow of air for reducing friction in the duct.

The foregoing description of exemplary embodiments of the invention provides illustration and description, but is not intended to be exhaustive or to limit the invention to the precise form disclosed. Modifications and variations are possible in light of the above teachings or may be acquired from practice of the invention.

For example, while a series of blocks have been described with regard to FIG. 4, the order of the blocks may be modified in other implementations. Further, non-dependent blocks may represent blocks that can be performed in parallel. For example, blocks 405, 415, and 420 may be performed in parallel or in any suitable order.

Even though particular combinations of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the implementations described herein unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A handheld device, comprising:
   a housing that includes a handle configured to be gripped by a hand of a user during operation of said device, said housing including a drop receiving channel extending therethrough; and
   a drive wheel rotatably positioned in the housing, where the drive wheel is configured to rotatably engage a fiber optic drop provided in the drop receiving channel,
   where the housing includes an air pathway that applies a first flow of pressurized air from an air source to a number of fins included on a flywheel attached to the drive wheel and which causes the drive wheel to rotate, said air source releasably connected via an air hose to said housing, and where the first flow of pressurized air which causes the drive wheel to rotate propels the fiber optic drop through the drop receiving channel.

2. The device of claim 1, where the housing further comprises:
an escape pathway that receives the first flow of pressurized air from the flywheel and applies the first flow of pressurized air to the drop receiving channel.

3. The device of claim 1, where the housing further comprises:
a second air pathway that applies a second flow of pressurized air from a second air source to the drop receiving channel.

4. The device of claim 1, further comprising:
a valve assembly that controls the application of the first flow of pressurized air to the drive wheel, and
an actuator that controls the valve assembly.

5. The device of claim 4,
where the housing includes a handle portion, and
where the actuator comprises a trigger positioned adjacent to the handle portion.

6. The device of claim 1, further comprising:
a guide wheel rotatably positioned in the housing, where the guide wheel is configured to rotatably engage the fiber optic drop in the drop receiving channel opposite the drive wheel.

7. The device of claim 6, further comprising:
a guide wheel support structure positioned in the housing for enabling vertical positioning of the guide wheel in the housing relative to the drop receiving channel.

8. The device of claim 7, where the guide wheel support structure includes a flexible support element for biasing the guide wheel against movement in a direction away from the drop receiving channel.

9. The device of claim 8, where the flexible support element comprises one of a band or a spring.

10. The device of claim 1, where a proximal end of the housing includes a drop receiving area adjacent to the drop receiving channel.

11. The device of claim 10, where the drop receiving area comprises a substantially conical shape.

12. The device of claim 1, where a distal end of the housing includes a duct receiving cavity adjacent to the drop receiving channel.

13. The device of claim 1, where the duct receiving cavity comprises a substantially cylindrical shape and is sized to receive a duct for receiving the fiber drop.

14. The device of claim 13, where the duct receiving cavity includes a duct receiving seal for limiting air flow around the duct.

15. The device of claim 13, where the duct comprises a microduct.

16. The device of claim 1, where the housing comprises an upper housing rotatably attached to a lower housing via a hinge, where an upper half of the drop receiving channel is formed in the upper housing and where a lower half of the drop receiving channel is formed in the lower housing.

17. A handheld fiber installation tool, comprising:
means, including a handle configured to be gripped by a hand of a user during operation of said tool and including a flywheel having a number of fins, for receiving a first flow of pressurized air from an air source coupled to said tool;
means for rotating a drive wheel based on the received first flow of pressurized air against said fins;
means for propelling a length of fiber through a channel based on rotation of the drive wheel; and
means for receiving a second flow of pressurized air in the channel.

18. The fiber installation tool of claim 17, where the means for receiving the first flow of pressurized air further comprises:
means for adjusting application of the first flow of pressurized air to the drive wheel; and
means for controlling movement of the adjusting means.

19. The fiber installation tool of claim 17, further comprising:
means for rotatably supporting a guide wheel on an opposite side of the channel from the drive wheel, such that propulsion of the length of fiber through the channel causes rotation of the guide wheel.

20. The fiber installation tool of claim 19, where the means for rotatably supporting the guide wheel further comprise:
means for adjusting a position of the guide wheel based on a diameter of the length of fiber.

21. The fiber installation tool of claim 17, further comprising:
means for receiving a duct at an end of the channel,
where the means for receiving a duct at an end of the channel further comprises means for reducing air leakage around the duct.

22. A method, comprising:
receiving a drop in a drop receiving channel contained within a handheld housing, said housing including a handle configured to be gripped by a hand of a user during performance of said method;
receiving a first source of pressurized air in a first air chamber located in said handheld housing, said first source of pressurized air received from an air source external said housing;
rotating a drive wheel located in said handheld housing, said drive wheel including a flywheel having a number of fins and being operatively connected to the first air chamber, said rotating based on the first source of pressurized air flowing against said fins,
where the drive wheel positively engages the drop in the drop receiving channel to propel the drop through the drop receiving channel; and
receiving a second source of pressurized air in the drop receiving channel.

23. The method of claim 22, further comprising:
adjusting, by manipulation by said user of a trigger associated with said handle, the flow of the first source of pressurized air to adjust a speed of rotation of the flywheel.

24. A method, comprising:
feeding an optical-fiber into an optical-fiber receptacle under user control of a hand-held device, said device including a flywheel having a number of fins, said flywheel rotatably operating in response to pressurized air flowing through said device and against said fins from an air source coupled to said device, said rotatable operation causing said feeding, said user controlling flow of said air and thereby controlling said feeding of said optical fiber.

25. Apparatus, comprising:
a hand-held device including a handle configured to be grasped by a hand of a user and a trigger mechanism configured to be operated by one or more fingers of said hand, said device further configured to feed an optical-fiber into an optical-fiber receptacle at a feed rate controllable by said user, said device including a flywheel having a number of fins, said flywheel rotatably operating in response to flow of pressurized air through said device and against said fins from an air source coupled to said device, said rotatable operation causing said feeding, and said user controlling said flow by operating said trigger mechanism.

26. The apparatus of claim 25 wherein said trigger mechanism includes a user-controllable actuator whereby said user controls said feed rate of said feed to increase as said flow increases and to decrease as said flow decreases.

27. The method of claim 24, or the apparatus of claim 25, wherein said optical-fiber receptacle is microduct.

* * * * *